(12) United States Patent
Fogal, Sr.

(10) Patent No.: US 7,022,753 B2
(45) Date of Patent: Apr. 4, 2006

(54) COMPOSITION FOR EQUALIZING RADIAL AND LATERAL FORCE VARIATIONS AT THE TIRE/ROAD FOOTPRINT OF A PNEUMATIC TIRE

(76) Inventor: Robert D. Fogal, Sr., 15 Kenwood Rd., Chambersburg, PA (US) 17201

( * ) Notice: Subject to any disclaimer, the term of this patent is extended or adjusted under 35 U.S.C. 154(b) by 547 days.

(21) Appl. No.: 10/019,838

(22) PCT Filed: May 11, 2001

(86) PCT No.: PCT/US00/12896

§ 371 (c)(1),
(2), (4) Date: Apr. 12, 2002

(87) PCT Pub. No.: WO00/68002

PCT Pub. Date: Nov. 16, 2000

(65) Prior Publication Data

US 2004/0224153 A1    Nov. 11, 2004

Related U.S. Application Data (60) Provisional application No. 60/133,775, filed on May 12, 1999.

(51) Int. Cl.
*C08K 3/00* (2006.01)
(52) U.S. Cl. .................. 523/220; 523/221; 524/35; 524/47; 524/451
(58) Field of Classification Search ............... 523/220
See application file for complete search history.

(56) References Cited

U.S. PATENT DOCUMENTS

| | | | |
|---|---|---|---|
| 3,230,999 A | 1/1966 | Hicks | |
| 3,463,551 A | 8/1969 | Clay | |
| 4,027,712 A | 6/1977 | Verdier | |
| 4,139,395 A | 2/1979 | Dunlap | |
| 4,546,612 A | 10/1985 | Santhanam | |
| 4,588,758 A | 5/1986 | Jaspon | |
| 4,776,888 A | 10/1988 | Morrow | |
| 4,867,792 A | 9/1989 | Ronlan | |
| 4,956,995 A | 9/1990 | Harrold et al. | |
| 4,998,448 A | 3/1991 | Ellis, Jr. | |
| 5,060,510 A | 10/1991 | Rousseau | |
| 5,073,217 A * | 12/1991 | Fogal .................. | 156/75 |
| 5,386,857 A | 2/1995 | Fogal, Sr. et al. | |
| 5,414,056 A | 5/1995 | Kirk | |
| 5,472,023 A | 12/1995 | Fogal, Sr. et al. | |
| 5,628,945 A | 5/1997 | Riman et al. | |
| 5,728,243 A | 3/1998 | Heffernan et al. | |
| 5,766,501 A | 6/1998 | Heffernan et al. | |
| 5,928,601 A * | 7/1999 | Miyake et al. ............ | 264/659 |
| 6,001,478 A | 12/1999 | Apecetche et al. | |
| 6,128,952 A | 10/2000 | LeBlanc | |
| 6,129,797 A | 10/2000 | Heffernan et al. | |
| 6,249,971 B1 | 6/2001 | Fogal, Sr. | |

FOREIGN PATENT DOCUMENTS

| | | |
|---|---|---|
| CA | 649236 | 9/1962 |
| GB | 1359462 | 7/1974 |
| GB | 1440186 | 6/1976 |
| WO | WO 00/68002 A1 | 11/2000 |

OTHER PUBLICATIONS

Hunter Engineering Company, "GSP 9700 Vibration Control System," 7 pages, printed from Hunter Engineering Company's Website on Mar. 4, 2002.

* cited by examiner

*Primary Examiner*—Edward J. Cain
(74) *Attorney, Agent, or Firm*—Hahn Loeser & Parks, LLP; Robert J. Clark (57) ABSTRACT

A composition or particle mixture (20) for equalizing radial and lateral forces at the tire/road footprint of a pneumatic tire (11) due to tire/wheel assembly imbalance, non-uniformity of the tire, temporary disturbances in the road surface, or other vibrational effects of the unsprung mass of a vehicle whereby the particle mixture (20) is inserted into the interior of the tire (11). The composition is a dry solid particle mixture (20) wherein the particles are freely flowable and non-tacky at elevated tire temperatures, the particle mixture (20) is essentially devoid of liquid material, and the particle mixture (20) comprises two or more sets of particles wherein each set consists essentially of particles of a predetermined size or size range. The particle mixture (20) exhibits a multimodal particle size distribution.

18 Claims, 4 Drawing Sheets

COMPOSITION FOR EQUALIZING RADIAL AND LATERAL FORCE VARIATIONS AT THE TIRE/ROAD FOOTPRINT OF A PNEUMATIC TIRE

This application claims the benefit of 60/133,775, filed May 12, 1999.

FIELD OF THE INVENTION

This invention relates to reducing disturbances in the unsprung mass of a passenger car or light truck and particularly to a composition or particle mixture for equalizing radial and lateral forces at the tire/road footprint of a pneumatic tire of a passenger car or light truck due to tire/wheel assembly imbalance, non-uniformity of the tire, temporary disturbances in the road surface, or other vibrational effects of the unsprung mass of a vehicle.

BACKGROUND OF THE INVENTION

A typical motor vehicle is generally characterized as comprising an unsprung mass and a sprung mass. The unsprung mass generally consists of all of the parts of the vehicle not supported by the vehicle suspension system such as the tire/wheel assembly, steering knuckles, brakes and axles. The sprung mass, conversely is all of the parts of the vehicle supported by the vehicle suspension system. The unsprung mass can be susceptible to disturbances and vibration from a variety of sources such as worn joints, misalignment of the wheel, brake drag, irregular tire wear, etc. Because vehicular tires support the sprung mass of a vehicle on a road surface and such tires are resilient, any irregularities in the uniformity or dimensions of the tire, any dimensional irregularities in the wheel rim, and/or any dynamic imbalance or misalignment of the tire/wheel assembly will cause disturbances and vibrations to be transmitted to the sprung mass of the vehicle thereby producing an undesirable vehicle ride, as well as reducing handling and stability characteristics. Severe vibration can result in dangerous conditions such as wheel tramp or hop and wheel shimmy (shaking side-to-side).

It is now standard practice to reduce some of these adverse vibrational effects by balancing the wheel rim and tire assembly by using a balance machine and clip-on lead weights. The lead balance weights are placed on the rim flange of the wheel and clamped in place in a proper position as directed by the balancing machine. The balancing procedure can reduce imbalance in the tire/wheel assembly, however, perfect balance is rarely achieved. Balancing is not an exact art and the results are dependent upon the specific set up of a tire/wheel assembly on a specific balancer at that moment in time. Balancing is an improvement and will reduce the vibration of the tire/wheel assembly in comparison to an unbalanced tire/wheel assembly. However, even perfect balancing of the tire/wheel assembly does not necessarily mean that the tire will roll smoothly. The balancing of the tire/wheel assembly must necessarily be done in an unloaded condition. When the balanced tire is placed on the vehicle, the weight of the vehicle acts on the tire through the interface or contact area of the tire and the road surface which is commonly known as the tire footprint. Irregularities in the tire are common such that even a perfectly balanced tire can have severe vibrations due to non-uniformities in the tire which result in unequal forces within the tire footprint.

A level of non-uniformity is inherent in all tires. In the art of manufacturing pneumatic tires, rubber flow in the mold or minor differences in the dimensions of the belts, beads, liners, treads, plies of rubberized cords or the like, sometimes cause non-uniformities in the final tire. When non-uniformities are of sufficient magnitude, they will cause force variations on a surface, such as a road, against which the tires roll and thereby produce vibrational and acoustical disturbances in the vehicle upon which the tires are mounted. Regardless of the cause of the force variations, when such variations exceed the acceptable minimum level, the ride of a vehicle utilizing such tires will be adversely affected.

Non-uniformity is generally characterized as 1) radial runout or out of roundness, 2) radial force variations, and 3) lateral force variations or conicity. Radial runout is the deviation from perfect roundness of the outer circumference of the tire. For example, the beads of the tire may be not exactly concentric relative to the axis of rotation of the tire or the tread may not be concentric with the beads. Radial force variation is the deviation from spindle load transmitted by a perfect tire during rotation. For example, radial force anomalies in a tire may result from "hard" and/or "soft" spots in the tire due to structural non-uniformities such as inconsistent wall thickness, ply turn-up variations, bead set, ply arrangement and other deviations. Lateral force variation is the deviation from straight tracking during rotation of the tire. For example, lateral force variations can result if the belt package of the tire is axially displaced or conically shaped. While lateral force variations will tend to pull the vehicle to a side of the road, it is primarily the radial force variations, including radial run-out, resulting in the vibration and acoustical effects which degrade the ride of the vehicle.

In a non-uniform tire, the radial run-out, the radial forces, and the lateral forces exerted by the tire will vary or change during its rotation. In other words, the magnitude and/or direction of the radial run-out, and the radial and lateral forces exerted by the tire will depend on which increment of its tread is contacting the surface.

Accordingly, methods have been developed to correct for excessive force variations by removing rubber from the shoulders and/or the central region of the tire tread by means such as grinding. These methods are commonly performed with a force variation or uniformity machine which includes an assembly for rotating a test tire against the surface of a freely rotating loading drum. This arrangement results in the loading drum being moved in a manner dependent on the forces exerted by the rotating tire whereby forces may be measured by appropriately placed measuring devices. A computer interprets the force measurements and grinders controlled by the computer remove rubber from the tire tread. However, grinding of the tire has certain disadvantages. For example, grinding can reduce the useful tread life of the tire, it may render the tire visually unappealing or it can lead to the development of irregular wear when the tire is in service on a vehicle.

While uniformity machines have been relatively successful in reducing the undue vibrations transmitted to the sprung mass of the vehicle by the tires, their complexity, manufacturing cost, and the requirement of trained operating personnel has limited the use of these devices primarily to the manufacturing facilities of the vehicle tire manufacturing companies. This has resulted in improved ride characteristics with respect to the original equipment tires on the vehicle but has done little to maintain the original improved ride characteristics when these original equipment tires are worn or replaced with after market replacement tires. Further, the methods used in uniformity testing usually mount the tire on an axle or arbor for testing rather than on the vehicular wheel rim. Because the wheel rim itself can have dimensional inaccuracies which affect uniformity and the remainder of the unsprung mass of the vehicle can also adversely affect uniformity characteristics, correcting the tires with force variation tire grinding without the tire being mounted on the wheel rim and vehicle on which it is to be used will fail to compensate for the total irregularities of the tire/wheel assembly. Furthermore, these characteristics can change as the tire is worn due to uneven or irregular wear and also normal wear progression.

Balancing of the tires has also been accomplished by using methods other than balance machines and lead weights. For example, Fogal in U.S. Pat. No. 5,073,217 disclosed a method of balancing a vehicle tire/wheel assembly by introducing a pulverulent synthetic plastic material into the interior chamber of the tire wheel assembly. The pulverulent synthetic plastic material has the added effect of compensating for the radial and lateral force variations generated at the tire road interface. The movement of the pulverulent synthetic plastic material within the tire is proportional to the downward force of the vehicle weight and the centrifugal force due to the tire rotation. While the invention disclosed in U.S. Pat. No. 5,073,217 worked effectively on truck tires having a large gross vehicle weight (GVW), the 20–40 mesh size pulverulent synthetic plastic material was found to not work as effectively for passenger type vehicles. The reason for the different performance is that the passenger vehicles have a significantly lower GVW. The movement of the inserted particles is directly related to the downward force on the tire. The weight of a typical passenger vehicle is not sufficient to move the 20–40 mesh size pulverulent synthetic plastic material properly within the passenger tire and was thus unable to effectively equalize the radial and lateral forces.

Therefore, there remains a need in the art for an improvement in reducing radial and lateral force variations at the tire footprint due not only to tire/wheel assembly imbalance, but reducing these force variations beyond the improvement levels available by balancing with only conventional balancing methods, in a manner reducing force variations from other causes as well.

SUMMARY OF THE INVENTION

An object of this invention is to overcome the deficiencies and disadvantages of the prior art, and provide a flowable material for compensating for, and reducing vibrations caused by radial and lateral forces at the tire/road footprint of a pneumatic tire due to tire/wheel assembly imbalance, non-uniformity of the tire, temporary disturbances in the road surface, or other vibrational effects of the unsprung mass of a vehicle.

A further object of this invention is to enable effective compensation of such radial and lateral force variations on a continuous basis during operation of a vehicle and to extend the tread life of the vehicle tire.

The flowable material of the present invention comprises dry, solid particle mixtures in which the particles are freely flowable and non-tacky at temperatures of up to at least 150° C. (300° F.), and in which particle size distribution is multimodal (or polymodal), as will be discussed in greater detail below. Compositions or particle mixtures according to this invention are those in which this particle size distribution is such as to be suitable for correcting tire imbalance and non-uniformities of a tire/wheel assembly.

The preferred particle mixture consists of smaller particles than those tested in U.S. Pat. No. 5,073,217. In an alternate embodiment the particle mixture is supplemented by talc which lubricates the tire innerliner surface and the individual particles of the particle mixture. The talc also acts as an anti-agglomeration agent to keep particles separate and freely flowing. The increased lubricity and smaller particle size result in decreased response time for movement of the particle mixture and also allows the particle mixture to properly disperse under the lower vehicle GVW condition of passenger cars and light trucks.

Depending on characteristics of the assembly or vehicle (such as GVW), the nature, size and quantity of the particle mixture is determined, the unsprung mass of the vehicle, the tire-to-road impact forces the particle mixture proportionately toward such areas to null or eliminate radial force variation and achieve load force equalization. In other words, an amount of the particle mixture is forced to areas opposite the impact and load forces, both sidewall-to-sidewall across the footprint of the tread and, of course, circumferentially about the tire. In this fashion irrespective of the specific load force at any point between tire and surface, eventual continuous tire rotation and tire load force variation results in displacement of the particle mixture to minimize radial and lateral force variations, thereby placing the tire/wheel assembly in a uniform and force equalized condition. The aforesaid force equalizing is desirably achieved instantaneously, and in the preferred embodiment, the particle mixture is relatively light and thus "moves" rapidly under variable load forces. Furthermore, the talc and the particle mixture are compatible with the tire innerliners to lubricate and thereby maintain or add resiliency to the innerliners.

With the above, and other objects in view that will hereinafter appear, the nature of the invention will be more clearly understood by reference to the following detailed description, the appended claims and the several views illustrated in the accompanying drawings.

DETAILED DESCRIPTION OF THE DRAWINGS

Figure 1:
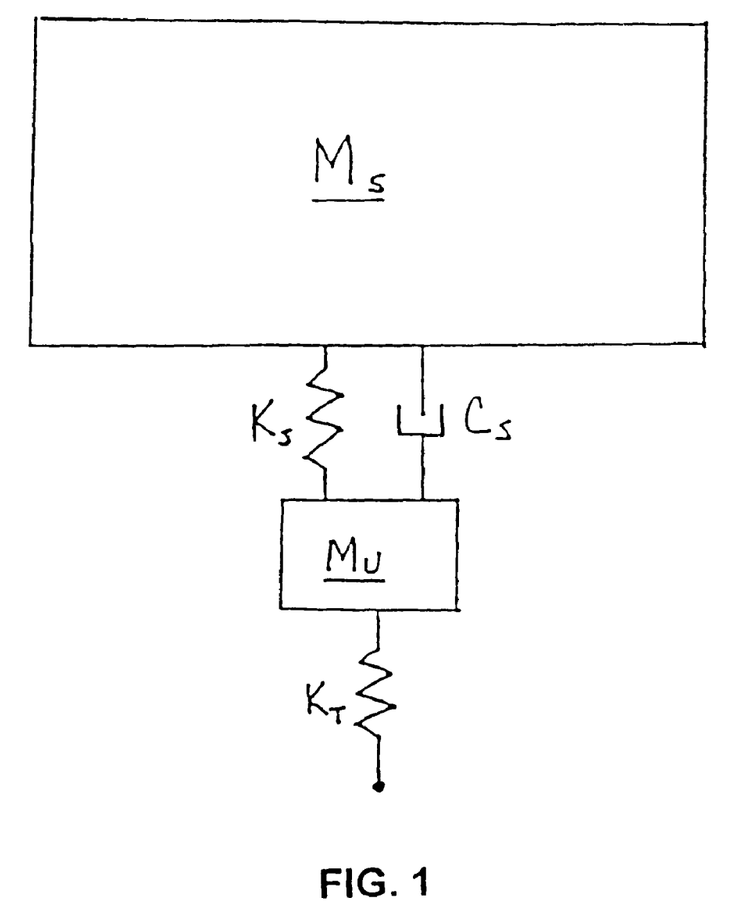
FIG. 1 shows a single wheel model of a vehicle showing the relationship of the sprung mass and the unsprung mass.

Reference is first made to FIG. 1 of the drawings which shows a single wheel model of a vehicle where symbol Ms denotes the mass of a sprung vehicle structure (hereafter referred to as sprung mass) and Mu denotes the mass of an unsprung structure (hereafter referred to as unsprung mass). The unsprung mass Mu generally consists of all of the parts of the vehicle not supported by the vehicle suspension system such as the tire/wheel assembly, steering knuckles, brakes and axles. The sprung mass Ms, conversely is all of the parts of the vehicle supported by the vehicle suspension system. Symbol Ks denotes the spring constant of a vehicle spring, and Cs denotes the damping force of the shock absorber. The unsprung mass Mu can be susceptible to disturbances and vibration from a variety of sources such as worn joints, misalignment of the wheel, brake drag, irregular tire wear, etc. The vehicular tires are resilient and support the sprung mass Ms of a vehicle on a road surface as represented by the spring rate of the tires as symbol Kt. Any irregularities in the uniformity or dimensions of the tire can result in a variable spring rate Kt which, as the tire rotates, can cause vibration of the unsprung mass Mu which is transmitted to the sprung mass Ms. In addition, any dimensional irregularities in the wheel rim, and/or any dynamic imbalance or misalignment of the tire/wheel assembly will cause disturbances and vibrations to be transmitted to the sprung mass Ms of the vehicle thereby producing an undesirable or rough vehicle ride, as well as reducing handling and stability characteristics of the vehicle.

Figure 2:
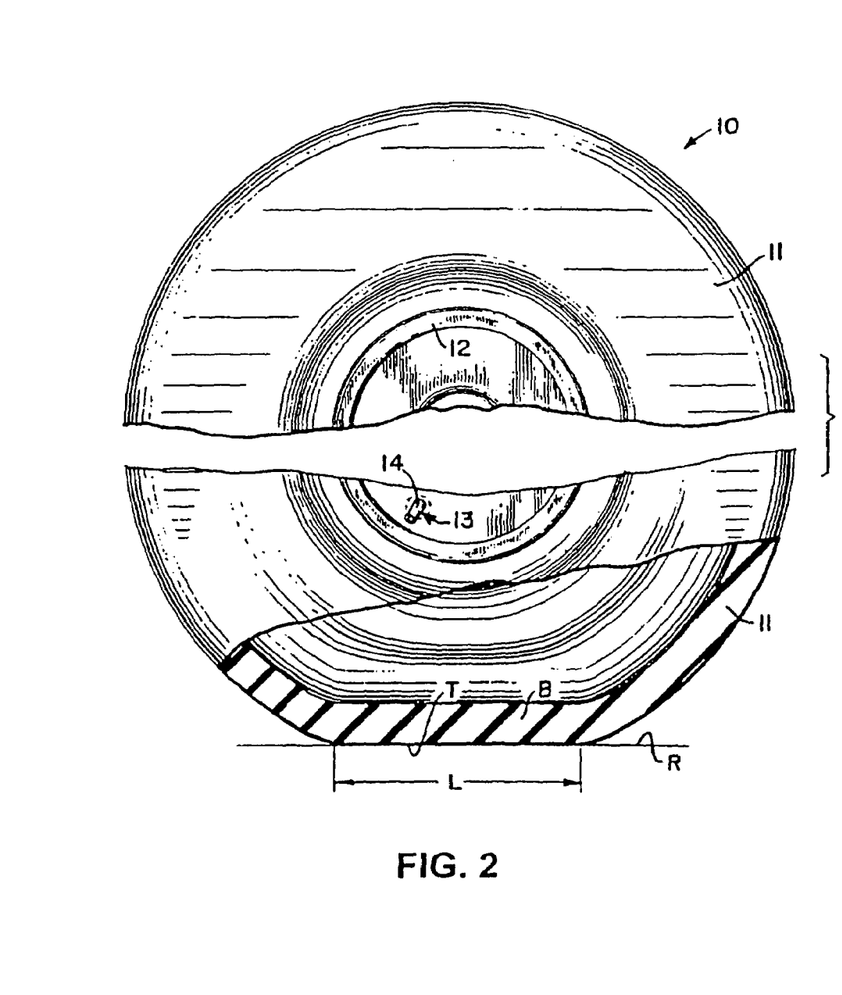
FIG. 2 is a fragmentary side elevational view of a conventional tire/wheel assembly including a tire carried by a rim, and illustrates a lower portion or "footprint" of the tire tread resting upon and bearing against an associated supporting surface, such as a road.
Figure 3:
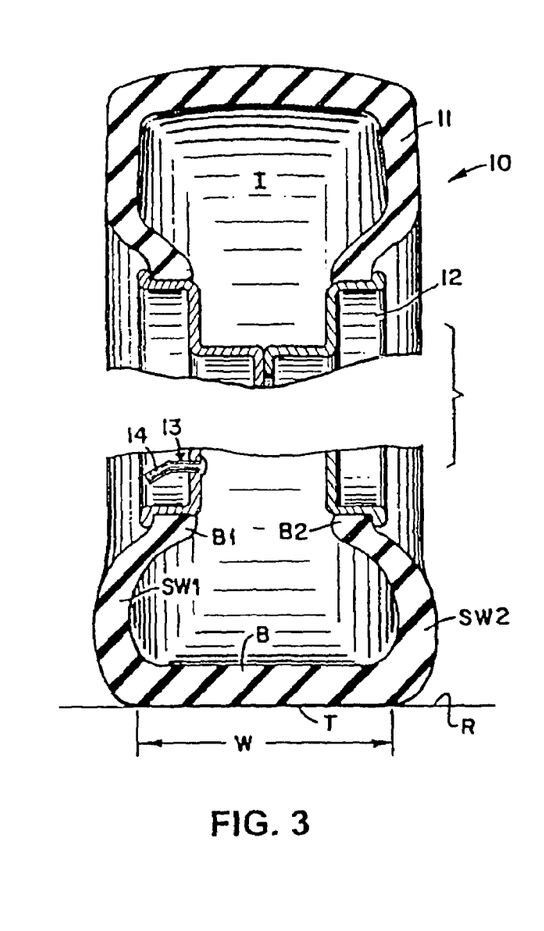
FIG. 3 is an axial vertical cross sectional view of a conventional rear position unsprung mass of vehicle including the tire/wheel assembly of FIG. 2 and additionally illustrates the lateral extent of the footprint when the tire rests under load upon the road surface.

Referring now to FIGS. 2 and 3 of the drawings which illustrate a tire/wheel assembly 10, that is an element of the unsprung mass Mu referred to in FIG. 1. A tire 11 and a metal rim 12 carrying a tire inflation valve define the tire/wheel assembly 10. The tire 11 is a radial tire. A biased tire essentially does not flex radially whereas a radial tire tends to flex radially, and in use the latter can be evidenced by sidewalls SW1, SW2 (FIGS. 2, 3 and 4) which tend to bulge outwardly under load when resting or running upon a surface, such as a road R. The amount of flex will vary depending upon such things as the tire construction, proper tire inflation, total load of the vehicle, the speed of the vehicle, etc. and the load force can vary from wheel assembly to wheel assembly both in smaller passenger vehicles and larger passenger vehicles, such as sports utility vehicles.

The radial tire 11 includes a lower tire portion or a footprint B defined by a length L and a lateral breadth or width W which collectively define the instantaneous cross sectional area of the tire footprint B in engagement with the supporting surface or road R when the tire/wheel assembly 10 is stationary or is rotating. The tire T includes a conventional external tire tread T and beads B1, B2 of the respective sidewalls SW1, SW2 which engage the rim 12 in a conventional manner.

If the tire/wheel assembly 10 and similar tire/wheel assemblies associated with a vehicle (not shown) are not properly/perfectly balanced, the attendant unbalanced condition thereof during vehicle wheel rotation will cause the tires to wear unevenly, wheel bearings will wear excessively, shock absorbers operate at inordinately higher amplitudes and speeds, steering linkages/mechanisms vibrate excessively and become worn and overall vehicle ride is not only rough and dangerous, but also creates excessive component wear of the entire vehicle. As previously mentioned, even if the tire/wheel assembly 10 was balanced as perfectly as possible with lead weights, other problems associated with the unsprung mass Mu such as non-uniformities in the tire, drag from the brakes, worn linkages, changing road conditions, tire wear, vehicle weight changes, etc., can cause even the "perfect" balanced tire/wheel assembly 10 to have vibrational problems. Accordingly, balancing of the tire/wheel assembly can be replaced and enhanced by using the particle mixture inside the tire to balance radial and lateral force variations. Thus, as forces vary during rotation of the tire/wheel assembly 10 relative to the road R, these forces must be equalized and the response time for such force variation equalization should be virtually instantaneous irrespective of the tire-to-road force and/or amplitude. It may be possible to balance the tire using a standard tire balance machine and lead weights in addition to using the improved particle composition of the present invention. However, any gains in reduced radial and lateral force variations at the tire footprint may be lost if the tire loses its balance due to wear or some other condition.

In keeping with the present invention, equalizing of radial and lateral forces at the tire/road footprint B of a pneumatic tire 11 due to tire/wheel assembly imbalance, non-uniformity of the tire, temporary disturbances in the road surface, or other vibrational effects of the unsprung mass Mu of a vehicle is accomplished by inserting an amount of a particle mixture 20 into the interior of the tire 11 of the tire/wheel assembly 10. A predetermined amount/weight of the material 20 can be placed in the interior I of the tire 11 prior to the tire 11 being mounted upon the rim 12. However, it is also possible to inject the flowable material 20 into the tire interior I after the tire 11 has been mounted on the rim 12, through the tire valve or air valve 13. This process is repeated with each tire of each tire/wheel assembly 10 of the particular vehicle involved, and once completed the vehicle is then merely driven along the road R whereupon each tire/wheel assembly 10 is rotated and the force variations are equalized.

Figure 4:
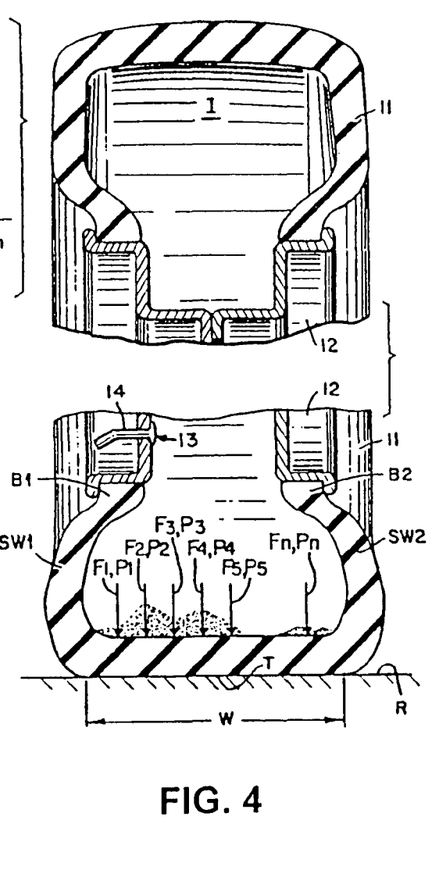
FIG. 4 is a cross sectional view of the tire/wheel assembly of FIG. 3 during rotation, and illustrates a plurality of radial load forces of different variations or magnitudes reacting between the tire and the road surface as the tire rotates, and the manner in which the particle mixture is forced in position in proportion to the variable radial impact forces.
Figure 5:
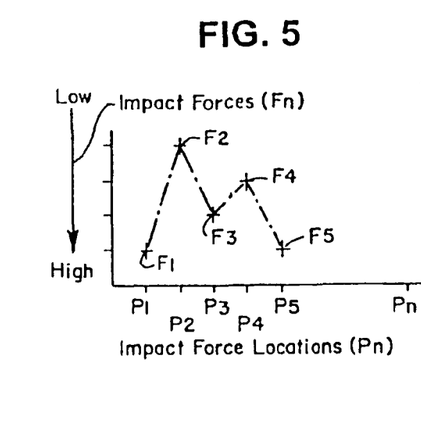
FIG. 5 is a graph, and illustrates the relationship of the impact forces to the location of the particle mixture relative to the tire when under rolling/running conditions during equalizing in accordance with FIG. 4.

Reference is made to FIGS. 4 and 5 which illustrate the innumerable radial impact forces (Fn) which continuously react between the road R and the tread T at the lower portion or footprint B during tire/wheel assembly rotation. There are an infinite number of such forces Fn at virtually an infinite number of locations (Pn) across the lateral width W and the length L of the footprint B, and FIGS. 4 and 5 diagrammatically illustrate five such impact forces F1–F5 at respective locations P1–P5. As is shown in FIG. 5, it is assumed that the forces F1–F5 are different each from each other because of such factors as tire wear at the specific impact force location, the road condition at each impact force location, the load upon each tire/wheel assembly, etc. Thus, the least impact force is the force F1 at location P1 whereas the greatest impact force is the force F2 at location P2. Once again, these forces F1–F5 are merely exemplary of innumerable/infinite forces laterally across the tire 11 between the sidewalls SW1 and SW2 and circumferentially along the tire interior which are created continuously and which vary as the tire/wheel assembly 10 rotates. As these impact forces are generated during tire/wheel assembly rotation, the particle mixture 20 relocates from its initial position in dependency upon the location and the severity of the impact forces Fn. The relocation of the particle mixture 20 through movement of the individual granules, powder and dust is also inversely related to the magnitude of the impact forces. For example, the greatest force F1 (FIG. 5) is at position P1, and due to these greater forces F1, the particle mixture 20 is forced away from the point P1 and the least amount of the particle mixture remains at the point P1 because the load force thereat is the highest. Contrarily, the impact force F is the lowest at the impact force location point P2 and therefor more of the particle mixture 20 will remain thereat (FIG. 4). In other words, at points of maximum or greatest impact forces (F1 in the example), the quantity of the particle mixture 20 is the least, whereas at points of minimum force impact (point P2 in the example), the quantity of particle mixture 20 is proportionately increased creating lift therefore equalizing the radial force variations. Accordingly, the vibrations or impact forces Fn force the particle mixture 20 to continuously move away from the higher or excessive impact areas F1 or areas of maximum imbalance F1 and toward the areas of minimum impact forces or imbalance F2. The particle mixture 20 is moved by these impact forces Fn both laterally and circumferentially, but if a single force and a single granule of the particle mixture 20 could be isolated, so to speak, from the standpoint of cause and effect, a single granule located at a point of maximum impact force Fn would be theoretically moved 180 degrees therefrom. Essentially, with an adequate quantity of particle mixture 20, the variable forces Fn create through the impact thereof a lifting effect within the tire interior I which equalizes the radial force variation applied against the footprint until there is a total force equalization circumferentially and laterally of the complete tire/wheel assembly 11. Thus the rolling forces created by the rotation of the tire/wheel assembly 10 in effect create the energy or force Fn which is utilized to locate the particle mixture 20 to achieve lift and force equalization and assure a smooth ride. Furthermore, due to the characteristics of the particle mixture 20, road resonance is absorbed as the tire/wheel assemblies 10 rotate.

Referring now to the particle mixture 20, the compositions according to the present invention are dry solid particle mixtures in which the particles are freely stable, flowable and non-tacky at elevated temperatures typically achieved by a tire such as temperatures up to 150° C. (300° F.). This temperature is above the highest operating temperature in a tire under normal conditions. The particle mixture is essentially devoid of liquid material, since the presence of liquid would interfere with free movement or tumbling of particles which is essential in order to obtain proper force equalization. Any particulate material that is stable and remains free flowing over all conditions of tire usage, has a specific gravity greater than 1, and is available in the particle sizes to be discussed below, can be used. An important requirement is that the particulate material must be more thermally stable than the tire in which it is used under all tire operating conditions. Another characteristic of composition according to this invention is the particles comprising the composition should have hardness sufficient to withstand the repeating tumbling which will occur in an automobile tire without substantial abrasion.

A particle mixture according to this invention may consist essentially of particles which are of regular shape (e.g., spheres or ellipsoids), preferably regular size and shape; or particles of irregular size and shape, e.g., pulverulent material (granules, powder or dust); or which may comprise a mixture of the two.

Compositions or particle mixtures according to the present invention can have a particle size distribution range which may be characterized as multimodal or polymodal (e.g., bimodal, trimodal or tetramodal). That is, a plot of weight fraction vs. particle diameter will show two or more particle sizes or particle size ranges having relatively high concentration of particles, separated by a region of particle size range in which there are no particles or few particles.

The particles according to the present invention are preferably polymeric (plastic) although any material exhibiting the necessary characteristics outlined above may be used. Polymeric materials are for the most part organic. Organic polymeric materials for the practice of this invention may be either homopolymers (polymers of one monomer) or copolymers (polymers of two or more monomers). Polymeric materials may be either thermoset or thermoplastic. Thermoset materials include urea formaldehyde, melamine formaldehyde, phenolic, or epoxy, to name a few of such materials. The thermoset resins described herein are available as molding powders, which typically include a major amount of the resin, a minor amount of a filler or fillers, and optionally small amounts of other ingredients. Suitable thermoplastics for particles according to the present invention include nylon and polyester (e.g., polyethylene terephthalate (or PET)). All of these materials are well known in particle form. Thermoset materials are inherently dry and non-melting. Thermoplastic materials in accordance with the present invention are those which have melting points (or softening points) above 150° C. (300° F.).

In addition to the particle mixture, an alternate embodiment of the present invention includes using a lubrication material such as talc as a supplement to the particle mixture. The talc coats the individual particles which results in an increase in lubricity of the mixture and enables the particles to move faster and in response to less force. The talc also acts as an anti-agglomeration agent to keep particles separate and freely flowing. In addition, the talc lubricates the innerliner of the tire which provides additional lubricity for particle movement and thereby maintain or add resiliency to the innerliners. The amount of talc used for passenger tires is preferably in a range of about 15–30% by weight of the amount of particle mixture inserted into the tire.

The composition according to a preferred embodiment of this invention consist essentially of particles (e.g., pulverulent material, which may be powder or dust), wherein the particles size distribution is multimodal. Such particle size distribution may be achieved, for example, by combining two sets of particles, wherein a first set consists essentially of particles in one size range (e.g., a coarser size range) and a second set of particles consists essentially of particles in a second size range (e.g., finer particles). The particle size distribution within each set of particle size range is typically such that the set has a modal particle size (which may be expressed either in terms of mesh or particle diameter) which represents the size having the greatest concentration of particles. Typically this modal diameter or size is somewhere in the middle of the size range, and there is a relatively small concentration of particles at either boundary of the size range. Size ranges of two sets of particles may be either overlapping or non-overlapping. When the size ranges of the two sets are non-overlapping, there will be a virtually zero concentration of particles having sizes which are between the two ranges. When the size ranges are overlapping, the overall mixture may exhibit two or more peaks representing modal particle sizes in the two or more sets, with valleys representing smaller concentrations of particles having sizes which are between the peaks. The zone of overlap (which is the particle size range in which two sets of particles overlap) will have a relatively small concentration of particles.

Figure 6:
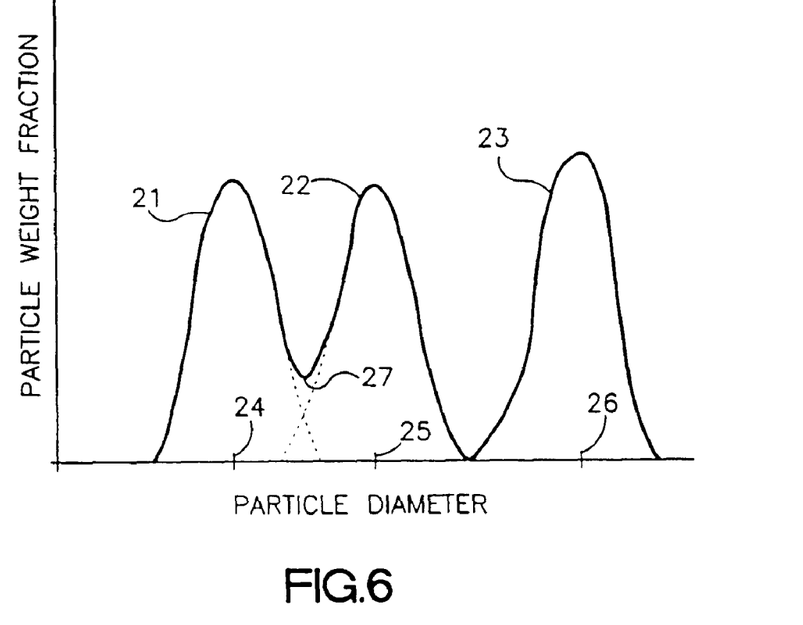
FIG. 6 is a graph of the balancing composition and illustrates the concept of multimodality as described in the present invention.
Figure 7:
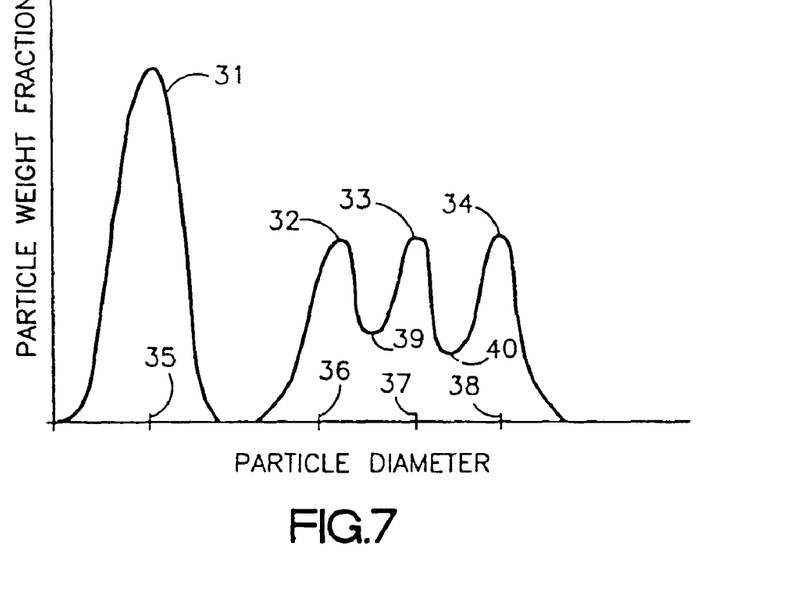
FIG. 7 is a graph similar to FIG. 6 and further illustrates the concept of multimodality as described in the present invention.

Referring now to FIGS. 6 and 7, graphs are shown of typical multimodal compositions. The graphs are a plot of weight fraction vs. particle diameter with both increasing with distance from zero point at the lower left side of the graph. FIG. 6 depicts a trimodal composition having three distinct particle diameter ranges 21, 22, and 23. The ranges are centered about midpoint of the each range identified as 24, 25, and 26, respectively. Ranges 21 and 22 are shown to overlap at area 27. Although not shown, areas of overlap may result in another smaller mode having a peak particle weight fraction at the point of intersection of the ranges. Range 23 does not overlap with any other range.

FIG. 7 depicts a multi-modal composition having one non-overlapping particle diameter range 31 and three overlapping particle diameter sizes 32, 33, and 34. The ranges are centered about midpoint of the each range identified as 35, 36, 37, and 38, respectively. While the particle weight fraction for each group was generally the same in FIG. 6, the particle weight fraction of range 31 is significantly larger than that of the other groups. Ranges 32, 33, and 34 are shown to overlap at areas 39 and 40. There are innumerable combinations of modes having different ranges of diameters and different weight fractions. One embodiment of the invention uses a polymodal blend having particle sizes of 60, 80, 100, 120, 240, 270 (U.S. mesh size) in which the weight percentages of the different sized particles are varied to optimize performance for a particular application. The smaller particles act as a lubricant making the addition of a lubricant material unnecessary. FIGS. 6 and 7 are not intended to limit the present invention to any particular composition make-up, but merely to aid in the understanding of the concept of the present invention. The modality and weight percentages for a particular material used in a particular make and size of tire on a particular vehicle can be adjusted experimentally to optimize the ability of the composition to balance the tire/wheel assembly.

Particle mixtures or compositions according to the present invention, having a multimodal particle size distribution, are highly advantageous for force equalizing a wheel assembly, as compared to previously known particle blends or mixtures in which sizes of particles vary continuously over the entire range or spectrum of sizes present. In a particle mixture of the present invention, smaller particles move first in response to smaller forces. The larger particles then move in a second stage when forces are greater. The relative absence of particles having sizes between those of the smaller particles and those of the larger particles appears to be advantageous in facilitating complete and rapid response to forces causing tire imbalance.

Smaller particles in compositions of the present invention will respond to smaller forces and move more quickly to a position opposite the force. The larger particles add stability and react to larger forces. Compositions of the present invention respond to smaller forces than do current formulations for balancing wheel assemblies. The forces encountered in a passenger or light truck tire are smaller than those encountered in larger tires, such as those used in trucks and airplanes. The compositions of the present invention fulfill a need for compositions which will afford both the effects of dynamic balancing and the equalization of radial and lateral force variations due to tire non-uniformity for passenger and light truck tires. Particle mixtures according to this invention respond more rapidly and more completely than do particle mixtures having a monomodal particle size distribution (i.e., a continuous spectrum of particle sizes ranging from a maximum to a minimum).

The optimum amount (or weight) of a particular particle mixture per tire to be used will vary over a wide range, depending on the size of the tire, the GVW, and amount of the tire is out of balance or other factors, whether this amount be expressed as a suitable range or as a optimum amount. For example, the preferred amount for passenger and light truck vehicles is in a range of 0.25–2.0 ounces while larger vehicles may use a much larger amount. In addition, the optimum size or size distribution of the particles in the composition will vary as well. Compositions with smaller particles are preferred for lighter weight vehicles as they will respond to smaller forces and move more quickly to a position opposite the force. The larger particles add stability and react to larger forces. For example, a multimodal blend of particle sizes for passenger and light truck vehicles comprises particle sizes of 60, 80, 100, 120, 240, 270 (U.S. mesh size) in which the weight percentages of the different sized particles are varied to optimize performance for a particular application. Another blend uses particle in a range of 60–80 mesh size. Other preferred formulations include fiberglass particles of 140–170 mesh size while larger vehicles may use a larger range preferably about 20–40 mesh size. A table showing the exemplary amounts of 60–80 mesh size particle mix and talc for different tire wheel sizes is shown below. The material amounts are given as a nominal value with a plus or minus tolerance and the talc is given as a range and generally represents 20–30% of the material amount:

| Exemplary Amount of 60–80 Mesh Size Pulverulent Synthetic Plastic Material and Talc for Passenger and Light Truck Tires | | |
|---|---|---|
| TIRE WHEEL SIZE | AMOUNT OF MATERIAL (oz.) | AMOUNT OF TALC (oz.) |
| 13" | 0.4 ± 0.2 | 0.1–0.2 |
| 14" | 0.7 ± 0.3 | 0.2–0.3 |
| 15" | 1.1 ± 0.4 | 0.2–0.4 |
| 16" | 1.3 ± 0.4 | 0.2–0.5 |
| 17" | 1.5 ± 0.5 | 0.3–0.6 |

These amounts can also be used for a multimodal blend of 60, 80, 100, 120, 240, 270 (U.S. mesh size), wherein the amount of talc is no longer necessary due to the small particles of the multimodal blend which act as a lubricant. The total amounts of the multimodal 60, 80, 100, 120, 240, 270 can be increased to include the weight amount of the replaced talc. In the 60, 80, 100, 120, 240, 270 blend, the weight percentage of the smaller particles, 240, 270 mesh, will generally correspond to the weight amount specified for talc when using the 60–80 blend.

The effectiveness of the present invention and the utilization of the particle mixture to equalize force variations of a tire/wheel assemblies was tested using an MTS Flat-Trac II® test machine. A Goodyear P225/60R16 Eagle LS tire was mounted on a 16×7.0 rim and inflated to 35 psi. The tire was dual plane balanced and then run on the test machine at 70 mph and then at 80 mph under a 1200 lb. test load. The $1^{st}$ order radial and fore/aft forces were recorded during each run. The tire was then single plane balanced and a quantity (q1) of the internal balancing material of the present invention was inserted into the tire. The test conditions were then repeated at both 70 and 80 mph. The test was repeated using a second quantity (q2) of the internal balancing material of the present invention inserted into the tire. Both test quantities were in the recommended quantity range for a 16" tire as disclosed above. The material used was a pulverulent blend used was a multimodal blend having particle sizes of 60, 80, 100, 120, 240, 270 U.S. mesh size. The results of the test are summarized below:

Test Results

| Goodyear Eagle LS - P225/60R16 at 35 psi on MTS Flat-Trac II ® at 1200 lbs. test load | | | | | |
|---|---|---|---|---|---|
| | Radial First Order Force Variation (pounds) | | | Fore/Aft First Order Force Variation (pounds) | |
| Speed (MPH) | Dual Plane Balance Only | Single Plane Balance and Material q1 | Single Plane Balance and Material q2 | Dual Plane Balance Only | Single Plane Balance and Material q1 | Single Plane Balance and Material q2 |
| 70 | 10.4 | 7.5 | 5.8 | 21.4 | 17.5 | 12.1 |
| 80 | 14.5 | 10.5 | 7.0 | 30.6 | 25.0 | 17.9 |

The test results show a significant improvement in the both radial and fore/aft force variations using the internal balancing material of the present invention. This results in an improved ride performance of the tire. The tire was also checked for a balance comparison where the tire was run unloaded and the radial $1^{st}$ order force variation was recorded. The test results are below:

| Goodyear Eagle LS - P225/60R16 at 35 psi on MTS Flat-Trac II ® at 0 lbs. test load | | | |
|---|---|---|---|
| BALANCE TEST | Dual Plane Balance Only | Single Plane Balance and Material q1 | Single Plane Balance and Material q2 |
| Radial First Order Force Variation (pounds) | 9.6 | 8.1 | 8.2 |

While the test results show improvement in the balance of the tire. The test results also show that the improvement obtained is not just related to the improvement of the tire balance, but to the ability of the internal balancing material of the present invention to equalize force variations when the tire is rotating under loaded conditions.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A system for equalizing radial and lateral force variations at a tire/road footprint of a pneumatic tire/wheel assembly comprising:
   a pneumatic tire/wheel assembly; and
   a dry solid particle mixture positioned within the tire/wheel assembly, wherein
   (a) the particles forming said particle mixture are freely flowable and non-tacky at temperatures up to 150 degrees C.;
   (b) said particle mixture is essentially devoid of liquid material;
   (c) said particle mixture comprises a plurality of sets of particles, wherein each set consists essentially of particles of a predetermined size or size range;
   (d) said particle mixture exhibits a multimodal particle size distribution; and
   (e) said particles are in a size range substantially between 60–270 U.S. screen size.

2. The system of claim 1, wherein said particle mixture comprises spheres of a first diameter and spheres of a second diameter.

3. The system of claim 1, wherein said particle mixture comprises a first set of particles having a first size range and a second set of particles having a second size range, the particle size distribution of said particle mixture being characterized by at least two peaks.

4. The system of claim 1, wherein said particle mixture comprises a first set of particles having a first size range, a second set of particles having a second size range, a third set of particles having a third size range, wherein the particle sizes ranges do not overlap.

5. The system of claim 1, wherein said particles forming said particle mixture have a specific gravity greater than 1.

6. The system of claim 1, wherein said particles forming said particle mixture have sufficient hardness to prevent them from degrading while tumbling in said tire.

7. The system of claim 1, wherein said mixture comprises polymeric resin particles.

8. The system of claim 7, wherein said particle mixture includes substantially 70% by weight of said polymeric resin and 28% by weight of a cellulose material.

9. The system of claim 7, wherein said polymeric resin is a thermoset material.

10. A dry solid particle mixture for equalizing radial and lateral force variations at the tire/road footprint of a pneumatic tire, wherein
    (a) the particles forming said particle mixture are freely flowable and non-tacky at temperatures up to 150 degrees C.;
    (b) said particle mixture is essentially devoid of liquid material;
    (c) said particle mixture comprises a plurality of sets of particles, wherein each set consists essentially of particles of a predetermined size or size range; and
    (d) said particle mixture exhibits a multimodal particle size distribution; and
    (e) said mixture comprises polymeric resin particles wherein said polymeric resin is a thermoplastic material.

11. A dry solid particle mixture for equalizing radial and lateral force variations at the tire/road footprint of a pneumatic tire, wherein
    (a) the particles forming said particle mixture are freely flowable and non-tacky at temperatures up to 150 degrees C.;
    (b) said particle mixture is essentially devoid of liquid material;
    (c) said particle mixture comprises a plurality of sets of particles, wherein each set consists essentially of particles of a predetermined size or size range; and
    (d) said particle mixture exhibits a multimodal particle size distribution; and
    (e) one set of particles is made of fiberglass.

12. The particle mixture according to claim 11, wherein said fiberglass particles are in a size range substantially between 130–200 U.S. screen size.

13. The system of claim 1, further comprising a lubricant material.

14. The system of claim 13, wherein said lubricant particles are in a size range substantially between 200–325 U.S. screen size.

15. The system of claim 13, wherein said particle mixture comprises 15–30% lubricant material by weight.

16. The system of claim 13, wherein said lubricant is talc.

17. The system of claim 13, wherein said lubricant is corn starch.

18. The system of claim 13, wherein said lubricant is an anti-agglomeration agent.

* * * * *